Figure 1:
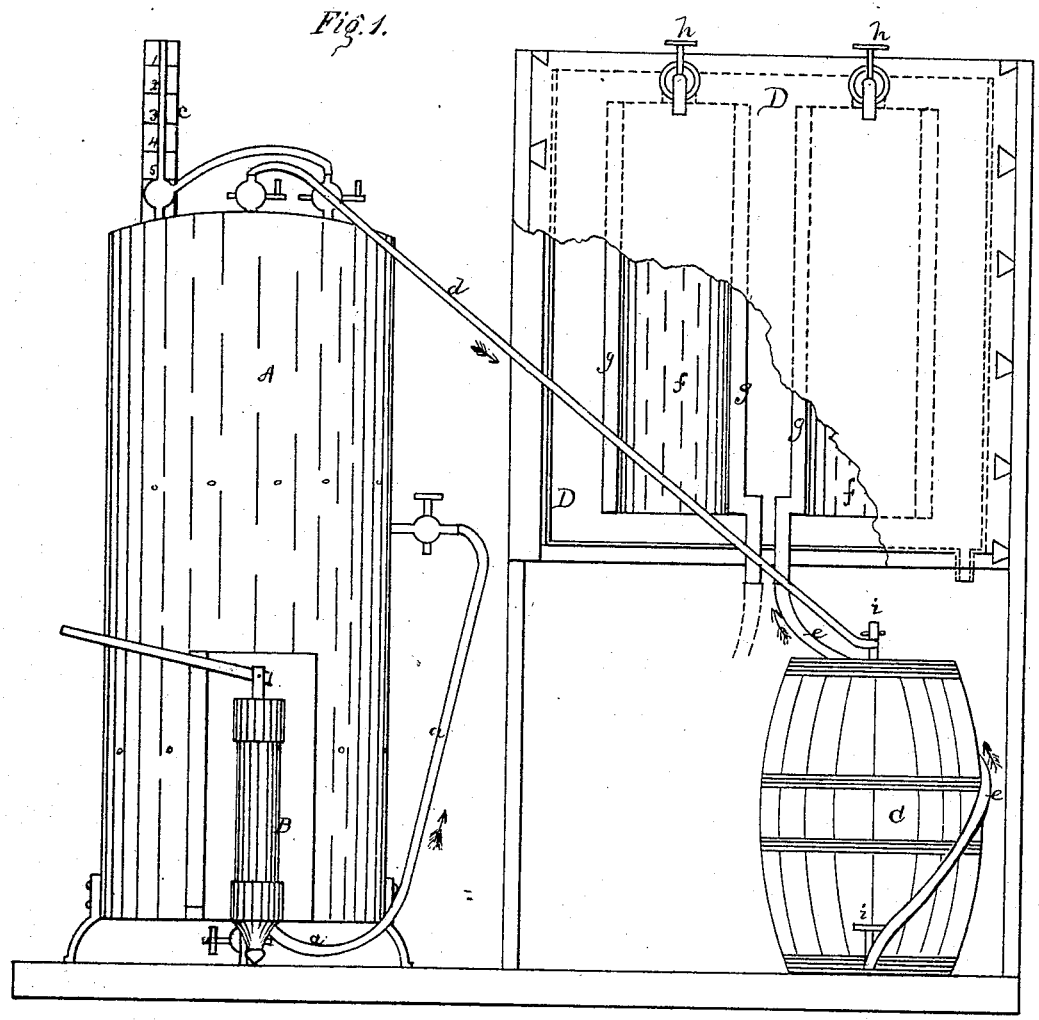

F. LOESCH.
Coolers for Preserving Beer and Wine.

No. 145,955. Patented Dec. 30, 1873.

Witnesses:
J. R. Drake
C. Hirsekorn

Inventor
Frank Loesch
by
Burke, Fraser & Co.
Attys

UNITED STATES PATENT OFFICE.

FRANK LOESCH, OF BUFFALO, NEW YORK, ASSIGNOR OF ONE-HALF HIS RIGHT TO GEORGE FISHER, OF SAME PLACE.

IMPROVEMENT IN COOLERS FOR PRESERVING BEER AND WINE.

Specification forming part of Letters Patent No. 145,955, dated December 30, 1873; application filed September 10, 1873.

*To all whom it may concern:*

Be it known that I, FRANK LOESCH, of the city of Buffalo, in the county of Erie and State of New York, have invented new and useful Improvements in Beer-Coolers, of which the following is a specification:

The object of this invention is to always have a constant pressure of air on the beer, and prevent the escape of the gas, and also keep the beer fresh and cool while being drawn for use. The improvements are fully hereinafter described.

In the drawings the figure represents a front elevation, A being a large air-tank made of boiler-metal, and having an air-pump, B, attached in any suitable manner, or in connection therewith by pipe a, or its equivalent, by which the tank is pumped full and kept filled with the amount of air required. The connections are supplied with cocks or valves to shut off the flow of air when desired. A gage, c, is attached to indicate the pressure of air in the tank. At or near the top of the tank is attached another pipe or tube, d, for the flow of air, and through which the air is forced into the top of a beer-barrel, C, thus filling what space there may be between the beer itself and the top of the barrel with air, and creating a pressure on the beer, which is thereby forced out at the bottom through a beer and air pipe, e, and up into cooling-receptacles f f, set in or forming part of a refrigerator or case, D. The receptacles f f are made of suitable metal with double walls or jackets g g, and in these walls g the beer stands while the inner part is filled with ice, and ice is also placed around the outer walls completely filling the spaces, thus keeping the beer cool, and, at the same time, retaining the gas and keeping it from becoming "flat," the compressed air making it "lively" until the barrel is emptied. The beer is drawn from these receptacles, by faucets h h, as desired for use.

By this simple arrangement the small kegs can be done away with, where the beer is used in any quantity, and larger barrels substituted, and the air-tank and beer-barrel may set in a cellar or basement, while by the connecting-pipes the beer may be forced up into the receptacles when situated in one or more stories above, or in any desired place. When one barrel runs out, it is disconnected in a few minutes by the connections i i, and another barrel attached. As fast as the pressure of air diminishes more can be immediately pumped in.

The construction of the refrigerator is important, as the receptacles f f may be always surrounded inside and out with ice, and the space g kept filled with fresh beer, doing away with all air-plugs, removing of kegs, and driving in of faucets, &c., to draw off the beer.

I claim—

The refrigerator D, having the beer-chambers f g, in combination with the beer-barrel C, air-tank A, and force-pump B, all arranged to operate substantially as and for the purpose described.

In witness whereof I have hereunto signed my name in the presence of two subscribing witnesses.

FRANK LOESCH.

Witnesses:
J. R. DRAKE,
T. H. PARSONS.